Nov. 19, 1968    P. W. HERD ET AL    3,411,416
ADJUSTABLE, METERED, DIRECTIONAL FLOW CONTROL ARRANGEMENT
Filed Jan. 29, 1965

INVENTORS
PAUL W. HERD,
JOHN O. ALLEN,
RAY G. HOLT
BY

Ely, Golrick & Flynn
ATTORNEYS

United States Patent Office 3,411,416
Patented Nov. 19, 1968

3,411,416
ADJUSTABLE, METERED, DIRECTIONAL FLOW
CONTROL ARRANGEMENT
Paul W. Herd, Lima, John D. Allen, South Euclid, and Ray G. Holt, Westlake, Ohio, assignors to Eton Yale & Towne, Inc., a corporation of Ohio
Filed Jan. 29, 1965, Ser. No. 429,064
3 Claims. (Cl. 91—451)

ABSTRACT OF THE DISCLOSURE

A directional flow control arrangement for selectively establishing reduced speed operation of a fluid motor comprises a spool valve having a spool which is adjustable to determine the direction of operation of the fluid motor and to provide a flow restriction for determining the motor speed, a pressure-compensating valve for bypassing fluid flow around the flow restriction in the spool valve, and a shuttle valve for connecting the outlet side of the flow restriction in the spool valve to a pressure-sensing port in the pressure-compensating valve.

---

Figure 1:
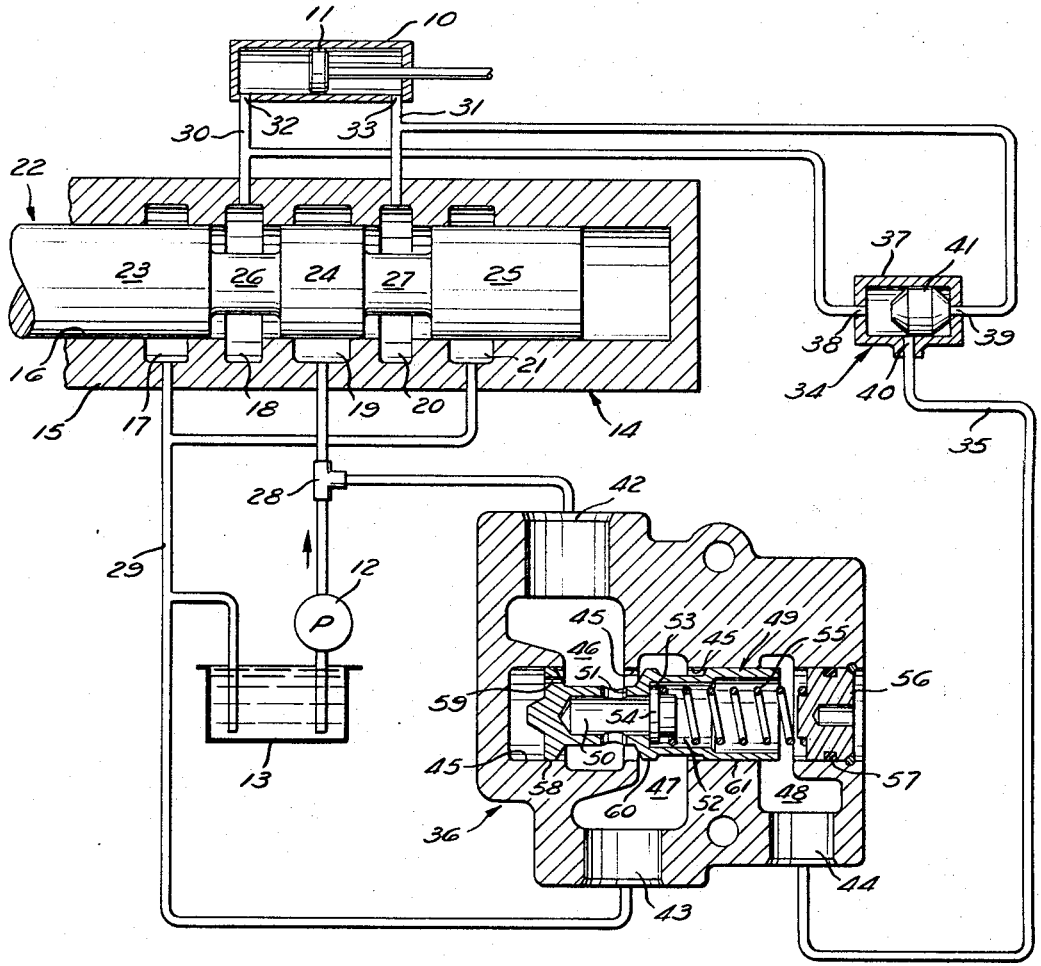

This invention relates to an arrangement for adjustably establishing a reduced flow of pressure fluid in a selected direction to a fluid-operated device.

Various directional flow control arrangements, such as spool valves, have been provided heretofore for controlling the flow of hydraulic fluid to a fluid-operated actuator, such as a piston and cylinder or another type of fluid motor. Such prior arrangements have been satisfactory where the valve was fully actuated to each of its operating positions to open its passages fully, so as to provide full speed operation of the fluid-operated actuator. However, such arrangements have not been entirely satisfactory where it was desired to provide a reduced, or metered, flow of fluid to the fluid-operated actuator to operate the actuator at reduced speed. For example, with conventional spool valves, if the valve spool is positioned to provide a partial flow condition, a very slight movement of the valve spool will produce a comparatively large change in the flow rate. To overcome this difficulty, it has been proposed to provide metering grooves or notches in the valve spool to enable more effective control over the flow rate for a given change in the position of the valve spool. However, such expedients have not been entirely satisfactory because the flow rate through such grooves or notches varies with the pressure of the fluid, so that a given setting of the valve spool does not necessarily produce a given flow rate.

The present invention relates to a novel flow control arrangement which completely overcomes these difficulties and enables an improved control over the metered flow of fluid to a fluid-operated actuator.

Accordingly, it is an object of this invention, to provide a novel and improved fluid control arrangement which enables the user to selectively establish a reduced fluid flow to a fluid-operated actuator which does not vary substantially with changes in the pressure of the fluid supply or the load on the actuator.

It is also an object of this invention to provide such an arrangement which enables the user to have a precise control over the input flow rate to the actuator, so as to provide the desired reduced speed of operation of the fluid-operated actuator.

Another object of this invention is to provide such an arrangement in which the spool valve itself provides the flow restriction orifice which establishes a reduced fluid flow to the fluid-operated actuator, with the inlet flow passage through the spool valve being pressure compensated in a novel manner to regulate the input flow therethrough to the fluid-operated actuator.

Another object of this invention is to provide such an arrangement which is relatively inexpensive and simple and foolproof in operation.

Further objects and advantages of this invention will be apparent from the following detailed description of a presently-preferred embodiment thereof, which is illustrated schematically in the accompanying drawing.

Figure 2:
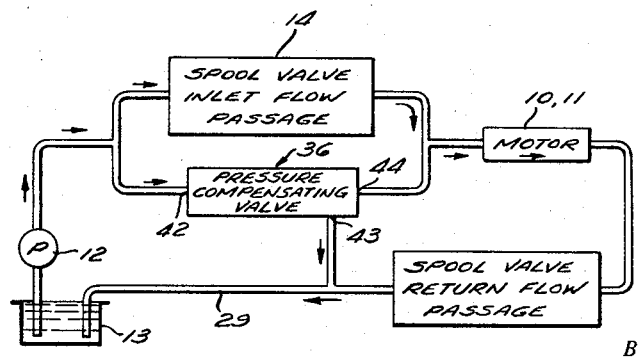

In the drawing:

FIGURE 1 is a schematic view, partly in section, showing a presently-preferred embodiment of the present flow control arrangement; and FIGURE 2 is a schematic block diagram of the FIG. 1 flow control arrangement.

Referring to FIG. 1, the hydraulic system shown therein comprises a fluid-operated actuator in the form of a conventional cylinder 10 and piston 11. The piston is adapted to be moved in one direction or the other by hydraulic liquid delivered by a pump 12 from a sump 13 through a conventional spool valve 14. The spool valve controls both the input flow from the pump to one end of the cylinder and the return flow from the opposite end of the cylinder back to the sump 13. The load (not shown) on the actuator is coupled to the shaft of piston 11 to be operated thereby, depending upon the latter's direction of movement.

The spool valve 14 comprises a housing or body 15 having a longitudinal cylindrical bore 16 therein and a plurality of annular recesses 17, 18, 19, 20 and 21, which intersect the bore at spaced locations along its length. Between these recesses the bore 16 presents cylindrical land surfaces. A valve spool 22 is slidably reciprocable in the bore 16, presenting three axially spaced cylindrical lands 23, 24 and 25, which are rigidly interconnected by reduced diameter stem portions 26 and 27. The lands 23–25 on the spool are sealingly engageable with the land surfaces of the bore 16. The spool may be selectively positioned axially along the bore manually or hydraulically or in any other convenient fashion.

The central recess 19 in the spool valve body 15 is connected to the output side of pump 12 through a T 28. The end recesses 17 and 21 in the spool valve body are both connected to a return line 29 leading back to the sump 13. The intermediate recesses 18 and 20 in the spool valve body are connected through respective lines 30 and 31 to the ports 32 and 33 at the opposite ends of cylinder 10.

In the neutral position of the valve spool 22, as shown in FIG. 1, its central land 24 sealingly engages the bore 16 in the valve body on opposite sides of the central recess 19, its left end land 23 sealingly engages the bore between recesses 17 and 18, and its right end land 25 sealingly engages the bore between recesses 20 and 21. Accordingly, in this position of the valve spool, it blocks the pump 12 from both ends of cylinder 10, and both ends of the cylinder are blocked from the return line 29.

When the valve spool 22 is shifted to the left in FIG. 1, its central land 24 is displaced away from sealing engagement with the bore 16 of the spool valve body between recesses 19 and 20, and at the same time its central land 24 continues to sealingly engage the bore between recesses 19 and 18, its left end land 23 is displaced away from sealing engagement with the bore between recesses 18 and 17, and its right end land 25 continues to sealingly engage the bore between recesses 20 and 21. Accordingly hydraulic liquid can flow from pump 12 through the central recess 19 in the spool valve, around the spool stem portion 27 to recess 20, and from there through line 31 to the right end port 33 of cylinder 10, moving piston 11 to the left. Return flow from the left end port 32 of the cylinder passes through line 30 to recess 18 in the spool valve, around the spool stem portion 26 to recess 17, and from there through return line 29 back to the sump 13.

When the valve spool 22 is shifted to the right in FIG. 1, its central land 24 is displaced away from sealing engagement with the bore 16 in the spool valve body between recesses 19 and 18, and at the same time its central land 24 continues to sealingly engage the bore between recesses 19 and 20, its right end land 25 is displaced away from sealing engagement with the bore between recesses 20 and 21, and its left end land 23 continues to sealingly engage the bore between recesses 17 and 18. Accordingly, hydraulic liquid can flow from pump 12 through the central recess 19 in the spool valve body, around the spool stem portion 26 to recess 18, and from there through line 30 to the left end port 32 of cylinder 10 to move piston 11 to the right. Return flow from the right end port 33 of the cylinder passes through line 31 to recess 20 in the spool valve, around the spool stem portion 27 to recess 21, and from there through return line 29 back to the sump 13.

A shuttle valve 34 of conventional design is connected between lines 30 and 31 and a line 35 leading to a pressure-compensating valve 36 in the present system. This shuttle valve includes a housing or body 37 having opposite end ports 38 and 39, which are connected respectively to lines 30 and 31, and a central port 40 connected to line 35. A valve member 41 is slidably disposed in the shuttle valve housing and is adapted to close one or the other of the end ports 38 and 39, depending upon the fluid pressure differential between them, and to permit fluid communication between the end port which is open and the central port 40.

The pressure compensating valve 36 has an inlet port 42 connected to the T 28, a low pressure return port 43 connected to the sump 13, and a pressure-sensing port 44 connected to line 35. In the operation of this system, the line 30 or 31 which is passing the input flow to one end of the cylinder 10 will be at a higher fluid pressure than the other line 31 or 30 which is passing the return flow from the opposite end of the cylinder. In response to this pressure differential, the valve member 41 in the shuttle valve 34 will move over to block the end port 38 or 39 which is connected to the lower pressure return flow line and to connect the higher pressure input flow line to line 35. Accordingly, the pressure-sensing port 44 in the pressure-compensating valve 36 will be at substantially the same fluid pressure as the spool valve recess 18 or 20 which is conducting the input flow. It is to be understood that the lines connecting the spool valve 14 to the shuttle valve 34 and the line 35 connecting the shuttle valve 34 to the pressure-compensating valve 36 are greatly exaggerated in length in FIG. 1 for convenience of illustration, and that in actual practice the valves are sufficiently close to each other that there is substantially no fluid pressure difference between port 44 of the pressure-compensating valve 36 and the spool valve recess 18 or 20 which is conducting the input flow from pump 12 to cylinder 10.

The pressure-compensating valve 36 has a bore 45 therein which is intersected at spaced locations along its length by a passage 46 extending from the inlet port 42, a passage 47 extending from the return port 43, and a passage 48 extending from the pressure-sensing port 44. A piston 49 is slidably disposed in this bore. This piston has a bore 50 therein and radial openings 51 leading into this bore from the inlet passage 46. The bore 50 extends to a counterbore 52, which is open at the right end of piston 49. The piston presents an annular internal shoulder 53 at the intersection of its bore 50 and counterbore 52. A closure member 54 is held against this shoulder 53 by a coil spring 55. The opposite end of this spring is engaged by a plug 56 fixedly mounted in the right end of the valve bore 45 and carrying an O-ring 57 which sealingly engages bore 45.

Near its left end in FIG. 1 the piston 49 presents a first cylindrical land 58 which slidably engages the valve bore 45 to the left of the inlet passage 46. At this location the piston has a small bleed passage 59 for equalizing the pressure on opposite sides of land 58.

Approximately midway along its length the piston 49 has a second cylindrical land 60 for sealing engagement with the valve bore 45 between the inlet passage 46 and the return passage 47.

At its right end the piston 49 has an elongated third cylindrical land 61 which sealingly engages the valve bore 45 between the return passage 47 and the passage 48 connected to the pressure-sensing port 44.

From FIG. 1 it will be apparent that the piston 49 and closure member 54 present surfaces facing to the left toward the inlet passage 46 and exposed to the pressure therein, and surfaces facing to the right toward passage 48 and exposed to the pressure therein, which are substantially equal in area. The fluid pressure at the inlet port 42 and passage 46 tends to move piston 49 to the right so as to connect inlet port 42 to return port 43, while the fluid pressure at port 44 and passage 48 urges piston 49 to the left to block port 42 from port 43.

In the operation of this valve, under all normal conditions the spring 55 maintains the closure member 54 seated against the internal shoulder 53 on the piston 49. Spring 55 also exerts a predetermined force biasing the piston 49 to the left, to a position in which its second land 60 sealingly engages the valve bore 45 between inlet passage 46 and the return passage 47, thereby blocking the flow of fluid between these passages.

In the operation of the system shown in FIG. 1, when it is desired to provide a restricted flow of fluid to and from cylinder 10 to move the piston 11 at a low speed, the valve spool 22 is shifted to the left or right from the neutral position shown, so as to provide a restricted inlet flow passage between pump 12 and one end of the cylinder and a restricted return flow passage between the opposite end of the cylinder and the return line. That is, the spool 22 itself constitutes the flow restriction orifice in the inlet flow passage, and the pressure differential between the opposite ends of this inlet flow passage in the spool valve determines the inlet flow rate to the cylinder. The inlet port 42 of the pressure-compensating valve 36 is connected to the inlet end of this inlet flow passage through the spool valve. The pressure-sensing port 44 of the pressure-compensating valve 36 is connected through the shuttle valve 34 to the outlet end of this inlet flow passage through the spool valve. Accordingly, the higher fluid pressure at the inlet end of this restricted inlet flow passage tends to urge piston 49 to the right and the lower fluid pressure at the outlet end of this restricted inlet flow passage tends to urge piston 49 to the left, adding to the force in the same direction which is exerted by spring 55. Consequently, the fluid pressure differential across the restricted inlet flow passage through the spool valve 14 is applied across piston 49, which regulates the input flow through this passage as follows:

If, for a given setting of the valve spool, this input flow tends to increase (such as, if the output pressure of pump 12 increases or the load on piston 11 is reduced), this increased flow rate would produce an increased fluid pressure differential across piston 49, moving the latter to the right to spill more of the pump output to the low pressure return port 43 and thereby subtracting from the input flow through the spool valve.

Conversely, if the input flow through the spool valve 14 tends to decrease (such as, if the output pressure of pump 12 decreases or the load on piston 11 increases), this decreased flow rate, for a given setting of the spool 22, would produce a decreased fluid pressure differential across piston 49 in the pressure compensating valve 36. Consequently this piston would move to the left to further restrict the flow from its inlet port 42 to its low pressure outlet port 43 and thereby permitting an increase in the flow from pump 12 to the inlet passage through spool valve 14.

The operation of this system is illustrated by the simplified block diagram shown in FIG. 2. From this figure it will be apparent that the piston 49 in the pressure-compensating valve between ports 42 and 44 is effectively in parallel with the inlet flow passage through the spool valve 14. Consequently, the fluid pressure drop across this inlet flow passage through the spool valve will be substantially equal to the fluid pressure drop between ports 42 and 44 of the pressure compensating valve 36. That is, the fluid pressure drop across the inlet flow passage through the spool valve 14 will be sensed at ports 42 and 44 of the pressure compensating valve 36 and will be applied across the piston 49 therein. For a given setting of the spool 22 (and thus a given orifice size in the inlet flow passage through the spool valve), any tendency of this fluid pressure drop across this inlet flow passage to increase or decrease will be sensed at ports 42 and 44 of the pressure compensating valve 36 and will cause the piston 49 to move therein in a direction to divert more or less of the pump output to the return flow port 43, and thereby eliminate the assumed change in the pressure drop across the inlet flow passage through the spool valve.

Consequently, for a given setting of the valve spool 22 the restricted input flow through the spool valve will remain substantially constant despite changes in the output pressure of pump 12 or of the load on piston 11.

Also, the pressure compensating valve 36 will adjust automatically to changes in the setting of the valve spool 22 as follows:

If the valve spool 22 is shifted from one orifice size position to a smaller orifice size position, this will increase the pressure differential across the inlet flow passage through the spool valve, and this increase of the pressure differential will be sensed at ports 42 and 43 of the pressure compensating valve 36, causing piston 49 therein to move to the right to provide an increased bypass flow between its ports 42 and 43, so that a higher percentage of the total output flow from pump 12 is diverted through valve 36 and away from the spool valve 14.

The reverse action takes place if the spool is shifted from one position to another providing an increased orifice size.

From the foregoing description it will be apparent that the illustrated embodiment of the present invention constitutes a novel and simplified arrangement for providing a regulated reduced or metered flow to and from a fluid-operated actuator such as a cylinder-and-piston. The spool valve 14 itself provides the flow restriction orifices in the input and return flow passages to and from the fluid-operated actuator, and the pressure-compensating valve 36 regulates the input flow so that the latter is determined only by the setting of the valve spool and is substantially unaffected by changes in the pump output pressure or the load on the fluid-operated actuator. Accordingly, the speed of operation of the cylinder-and-piston 10, 11 or other fluid-operated actuator will always be the same for a given setting of the spool valve. Also, very smooth modulation of the fluid flow, proportional to the adjustment of the spool valve, is obtained.

While a presently-preferred embodiment of the invention has been described in detail herein and illustrated in the accompanying drawing, it is to be understood that the invention is susceptible of other embodiments and that various modifications, omissions and refinements which depart from the disclosed embodiment may be adopted without departing from the spirit and scope of this invention. For example, the shuttle valve 34 may be replaced by a different type of pressure-responsive valve or by a directional valve coupled to the spool valve for operation in unison therewith.

We claim:
1. A directional flow control arrangement for selectively operating a fluid motor at a controlled speed comprising:
directional valve means having first and second motor ports for connection respectively to the opposite sides of said motor and operable selectively to provide a restricted inlet flow passage therethrough for passing input pressure fluid to one of said motor ports and a return flow passage for passing return fluid from the other of said motor ports;
a pressure-compensating valve having an inlet port connected to the inlet end of said inlet flow passage through said directional valve means, a low pressure return port, a pressure-sensing port, a movable valve member controlling the flow of fluid from said inlet port to said return port, means biasing said valve member to a position blocking said inlet port from said return port, and said movable valve member having opposite surfaces thereon exposed respectively to the fluid pressure at said inlet port and at said pressure-sensing port;
and a shuttle valve connected between both said motor ports of said directional valve means and said pressure-sensing port of the pressure-compensating valve, said shuttle valve having a pressure-sensitive valve member therein having its opposite ends exposed respectively to the fluid pressures at said motor ports and movable in response to a fluid pressure differential between said motor ports to connect the higher pressure motor port at the outlet end of said inlet flow passage through the spool valve to said pressure-sensing port of the pressure-compensating valve;
said movable valve member in the pressure-compensating valve being movable, in response to the fluid pressure differential between its inlet port and its pressure-sensing port, to connect said inlet port to said return port for bypassing input pressure fluid from said directional valve means to thereby regulate the input flow through said directional valve means.

2. A directional flow control arrangement for selectively operating a fluid motor at a controlled speed comprising:
a spool valve having first and second motor ports for connection respectively to the opposite sides of said motor and operable selectively to provide a restricted inlet flow passage therethrough for passing input pressure fluid to one of said motor ports and a return flow passage for passing return fluid from the other of said motor ports;
a pressure-compensating valve having an inlet port connected to the inlet end of said inlet flow passage through the spool valve, a low pressure return port, a pressure-sensing port, a movable valve member controlling the flow of fluid from said inlet port to said return port, means biasing said valve member to a position blocking said inlet port from said return port, and said movable valve member having opposite surfaces thereon exposed respectively to the fluid pressure at said inlet port and at said pressure-sensing port;
and a shuttle valve connected between both said motor ports of the spool valve and said pressure-sensing port of the pressure-compensating valve, said shuttle valve having a pressure-sensitive valve member therein having its opposite ends exposed respectively to the fluid pressures at said motor ports and movable in response to a fluid pressure differential between said motor ports to connect the higher pressure motor port at the outlet end of said inlet flow passage through the spool valve to said pressure-sensing port of the pressure-compensating valve;
said movable valve member in the pressure-compensating valve being movable in response to the fluid pressure differential between its inlet port and its pressure-sensing port to connect said inlet port to said return port for bypassing input pressure fluid from the spool valve to thereby regulate the input flow through the spool valve.

3. A directional flow control arrangement for selectively operating a fluid-operated actuator means at a controlled speed comprising:

directional valve means having an inlet and having first and second motor ports for connection respectively to the opposite sides of said actuator means and operable selectively to provide a restricted inlet flow passage of adjustable size from said inlet to one of said motor ports for passing input pressure fluid to said actuator means and a return flow passage for passing fluid from the other of said motor ports;

a pressure-compensating valve having an inlet port for connection to a source of pressure fluid ahead of the inlet of said directional valve means, a bypass outlet port for bypassing pressure fluid away from said directional valve means, a pressure-sensing port connected to the outlet end of said inlet flow passage through said directional valve means, a movable valve member controlling the flow of fluid from said inlet port to said bypass outlet port, means biasing said valve member to a position blocking said inlet port from said bypass outlet port, and said movable valve member having oppositely facing surfaces thereon exposed respectively to the fluid pressure at the inlet of said directional valve means and at said pressure-sensing port and being positioned in accordance with the pressure differential between the latter to control the division of fluid flow from said source between said bypass outlet port and the inlet of said directional valve means;

and a shuttle valve connected between both said motor ports and said pressure-sensing port and having a pressure-sensitive valve member therein which has its opposite ends exposed respectively to the fluid pressures at said motor ports and which is movable in response to the fluid pressure differential between said motor ports to connect the motor port at the outlet end of said inlet flow passage through said directional valve means to said pressure-sensing port and to block the other motor port from said pressure-sensing port.

References Cited

UNITED STATES PATENTS

| | | | |
|---|---|---|---|
| 3,033,277 | 5/1962 | Cowles et al. | 137—117 |
| 3,038,487 | 6/1962 | Gardner | 137—112 |
| 3,145,734 | 8/1964 | Lee et al. | 137—117 |
| 3,151,455 | 10/1964 | Tennis | 60—52 |
| 3,230,841 | 1/1966 | York | 91—446 |
| 3,234,957 | 2/1966 | Allen | 60—52 |

MARTIN P. SCHWADRON, *Primary Examiner.*

B. L. ADAMS, *Assistant Examiner.*